United States Patent
Umemura

(10) Patent No.: US 12,333,749 B2
(45) Date of Patent: Jun. 17, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Naoki Umemura, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 88 days.

(21) Appl. No.: 17/709,826

(22) Filed: Mar. 31, 2022

(65) Prior Publication Data

US 2022/0319028 A1   Oct. 6, 2022

(30) Foreign Application Priority Data

Apr. 6, 2021   (JP) .................................. 2021-064865

(51) Int. Cl.
*G06T 7/55* (2017.01)
*A63B 71/06* (2006.01)
(Continued)

(52) U.S. Cl.
CPC ............ *G06T 7/55* (2017.01); *A63B 71/0605* (2013.01); *G06T 7/60* (2013.01); *G06T 7/75* (2017.01);
(Continued)

(58) Field of Classification Search
CPC .... G06T 7/55; G06T 7/60; G06T 7/75; G06T 17/00; G06T 2207/30224; A63B 71/06;
(Continued)

(56) References Cited

U.S. PATENT DOCUMENTS

| 9,430,850 B1* | 8/2016 | Domanski ............... G06F 18/00 |
| 2006/0068945 A1* | 3/2006 | Murchison ........... A63B 67/002 |
| | | 473/472 |

(Continued)

FOREIGN PATENT DOCUMENTS

| EP | 3605471 A1 | 2/2020 |
| EP | 3671638 A1 | 6/2020 |

(Continued)

OTHER PUBLICATIONS

Schwenkrei et al. ("A Graded Concept of an Information Model for Evaluating Performance in Team Handball") 2019 by SCITEPRESS. (Year: 2019).*

(Continued)

*Primary Examiner* — Sing-Wai Wu
*Assistant Examiner* — Khoa Vu
(74) *Attorney, Agent, or Firm* — Carter, DeLuca & Farrell LLP

(57) ABSTRACT

The information processing apparatus generates three-dimensional shape data representing a three-dimensional shape of a first object by using a plurality of images obtained by a plurality of imaging apparatuses capturing the first object. The information processing apparatus estimates a size of the first object by using the three-dimensional shape data. The information processing apparatus specifies a position of a second object that is captured by the plurality of imaging apparatuses based on results of a comparison between the estimated size of the first object and a predetermined reference value.

17 Claims, 13 Drawing Sheets

(51) Int. Cl.
  *G06T 7/60* (2017.01)
  *G06T 7/73* (2017.01)
  *G06T 17/00* (2006.01)
  *G06V 20/64* (2022.01)
(52) U.S. Cl.
  CPC .............. *G06T 17/00* (2013.01); *G06V 20/64* (2022.01); *A63B 2220/05* (2013.01); *A63B 2220/62* (2013.01); *A63B 2220/806* (2013.01); *A63B 2243/0025* (2013.01); *A63B 2243/0033* (2013.01); *A63B 2243/0037* (2013.01); *G06T 2207/30224* (2013.01)
(58) Field of Classification Search
  CPC ............ A63B 2220/05; A63B 2220/62; A63B 2220/806; A63B 2243/0025; A63B 2243/0033; A63B 2243/0037; A63B 71/0619; G06V 20/64; G06V 10/62; G06V 20/42; G06V 20/04; G06V 20/647; H04N 13/243; H04N 13/117; H04N 13/279; G07C 1/28
  See application file for complete search history.

(56) References Cited

U.S. PATENT DOCUMENTS

| | | | |
|---|---|---|---|
| 2012/0172679 A1* | 7/2012 | Logan | A61B 5/6803 600/301 |
| 2019/0163356 A1* | 5/2019 | Hanamoto | H04N 23/90 |
| 2019/0221029 A1* | 7/2019 | Yoneda | G06T 7/70 |
| 2019/0311526 A1* | 10/2019 | Sugio | H04N 21/2343 |
| 2019/0340777 A1* | 11/2019 | Takama | G06T 7/70 |
| 2019/0378326 A1* | 12/2019 | Ito | G06T 17/00 |
| 2020/0034989 A1* | 1/2020 | Koyama | H04N 23/60 |
| 2020/0167936 A1* | 5/2020 | Marty | G06T 7/80 |
| 2021/0299549 A1* | 9/2021 | Simeone | A63B 67/002 |
| 2022/0230337 A1 | 7/2022 | Umemura | |

FOREIGN PATENT DOCUMENTS

| | | |
|---|---|---|
| JP | 2013-232181 A | 11/2013 |
| JP | 2020-101845 A | 7/2020 |
| JP | 2021-033682 A | 3/2021 |

OTHER PUBLICATIONS

Kamble, P.R. et al., "Ball tracking in sports: a survey" Artif Intell Rev (Oct. 2019) pp. 1655-1705, vol. 52.

Extended European Search Report issued by the European Patent Office on Sep. 9, 2022 in corresponding EP Application No. 22166452.7.

Office Action issued by the Indian Patent Office on Oct. 18, 2022 in corresponding IN Application No. 202244020143, with English translation.

Notice of Reasons for Refusal issued by the Japanese Patent Office on Mar. 11, 2025 in corresponding JP Patent Application No. 2021-064865, with English Translation.

* cited by examiner

|  | x | y | z | VOXEL PRESENCE/ ABSENCE | \multicolumn{5}{c}{PERIPHERAL VOXEL PRESENCE/ABSENCE} | IMAGE CAPTURING-TARGET OBJECT GROUP |
|---|---|---|---|---|---|---|---|---|---|---|
|  |  |  |  |  | SV1 | SV2 | SV3 | ... | SV25 | SV26 |  |
| V1 | 0 | 0 | 0 | 1 | 0 | 0 | 0 | ... | 0 | 0 | A |
|  | 0 | 0 | 1 | 0 | – | – | – | – | – | – | – |
|  | 0 | 0 | 2 | 0 | – | – | – | – | – | – | – |
|  | . | . | . | . | . | . | . | . | . | . | . |
|  | . | . | . | . | . | . | . | . | . | . | . |
|  | . | . | . | . | . | . | . | . | . | . | . |
| V2 | 2 | 0 | 0 | 1 | 0 | 0 | 0 | ... | 1 | 0 | B |
| V3 | 2 | 0 | 1 | 1 | 0 | 0 | 0 | ... | 0 | 1 | B |
|  | . | . | . | . | . | . | . | . | . | . | . |
|  | . | . | . | . | . | . | . | . | . | . | . |
|  | . | . | . | . | . | . | . | . | . | . | . |

| GAME | FOUL/VIOLATION | | | | | |
|---|---|---|---|---|---|---|
| BASKETBALL | 24-SECOND RULE | 8-SECOND RULE | 5-SECOND RULE | 3-SECOND RULE | TRAVELING | DOUBLE DRIBBLE |
| SOCCER | OFFSIDE | HANDS | ... | | | |
| HANDBALL | 7-METER THROW | OVERTIME | OVERSTEP | DOUBLE DRIBBLE | ... | |
| . | | | | | | |
| . | | | | | | |
| . | | | | | | |

FIG.12

INFORMATION PROCESSING APPARATUS, INFORMATION PROCESSING METHOD, AND STORAGE MEDIUM

FIELD

The present disclosure relates to an information processing apparatus, an information processing method, and a storage medium.

DESCRIPTION OF THE RELATED ART

In recent years, in order to check whether the determination of a referee is correct or not in a sports game, a referee assistance system has been introduced, which displays an image including a target play on a display device among images obtained by image capturing by a plurality of imaging apparatuses installed around a sports stadium. Japanese Patent Laid-Open No. 2013-232181 has described a technique to determine whether or not image capturing-target objects, such as a player and a ball, have contacted each other based on results of calculation to calculate a moving speed and acceleration of each image capturing-target object from two-dimensional images obtained by image capturing by a plurality of imaging apparatuses in a game of soccer.

SUMMARY

For example, in basketball, there is a rule called a so-called 24-second rule. This requires that one of teams need to take a shot within 24 seconds after the team gets the ball. This determination is based on whether the ball has separated from a player at the point in time at which 24 seconds have elapsed, and therefore, an image in which the instant the ball has separated from the hand of the player is captured is necessary. For example, in a case where occlusion occurs due to the position relationship between players, it is difficult to specify the instant the ball has separated from the hand of the player even by adopting the technique of Japanese Patent Laid-Open No. 2013-232181.

The present disclosure has been made in view of the above-described problem and provides a technique to obtain information capable of assisting a referee in performing determination, for example, in a sports game.

An information processing apparatus according to one embodiment of the present disclosure generates three-dimensional shape data representing a three-dimensional shape of a first object by using a plurality of images obtained by a plurality of imaging apparatuses capturing the first object, estimates a size of the first object by using the three-dimensional shape data, and specifies a position of a second object that is captured by the plurality of imaging apparatuses based on results of a comparison between the size of the first object estimated in the estimating and a predetermined reference value.

Further features of the present disclosure will become apparent from the following description of exemplary embodiments with reference to the attached drawings.

BRIEF DESCRIPTION OF THE DRAWINGS

FIG. 12 is a table showing examples of fouls/violations of each game; and

DESCRIPTION OF THE EMBODIMENTS

In the following, embodiments of the present disclosure are explained with reference to the drawings. The following embodiments are not intended to limit the present disclosure according to the claims and all combinations of features explained in the present embodiments are not necessarily indispensable to the solution of the present disclosure. The same reference number is attached to the same component and its explanation is omitted.

First Embodiment

Figure 1:
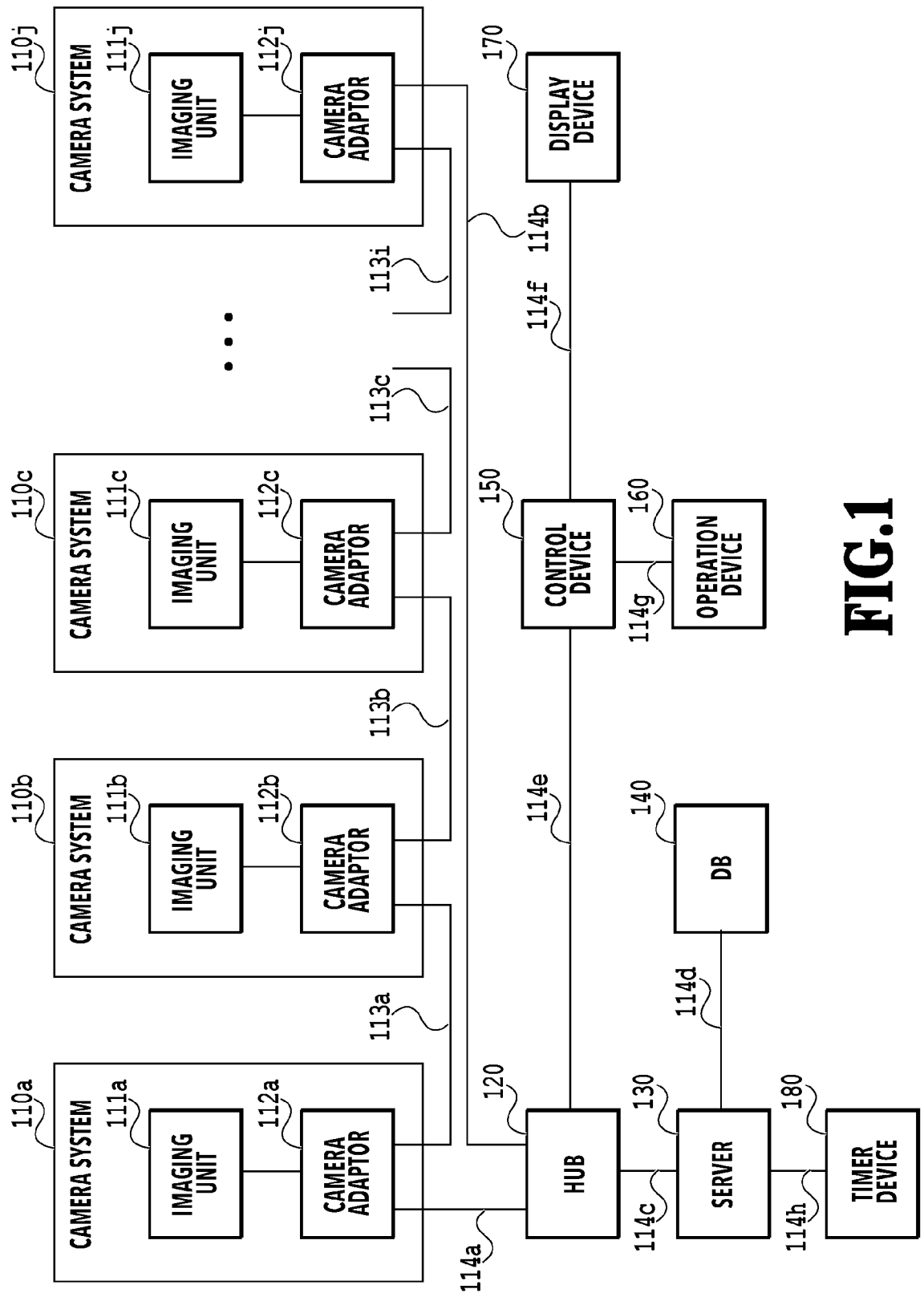
FIG. 1 is a block diagram showing a configuration example of a virtual viewpoint image generation system.

A virtual viewpoint image generation system according to the present embodiment is explained using a diagram. FIG. 1 is a diagram showing a hardware configuration example of the virtual viewpoint image generation system according to the present embodiment. The virtual viewpoint image generation system of the present embodiment has camera systems 110a-110j, a switching hub 120, a server 130, a database 140, a control device 150, an operation device 160, a display device 170, and a timer device 180.

Within each of the camera systems 110a-110j, each of imaging units 111a-111j including a lens, an imaging sensor and the like and each of camera adaptors 112a-112j that perform control of the imaging unit and predetermined image processing in accordance with instructions of the control device 150 are provided, respectively. Each of the imaging units 111a-111j is, for example, an imaging apparatus, such as a camera. Each of the camera adaptors 112a-112j comprises a central processing unit (CPU or ASIC) and memories (RAM and ROM) necessary for control and image processing.

Further, the adjacent camera systems of the camera systems 110a-110j are connected by each of network cables 113a-113i by the daisy chain method. Image data captured by each of the camera systems 110a-110j is transferred via each of the network cables 113a-113i. The switching hub (in the following, described as "HUB") 120 performs routing of data transfer on the network. The HUB 120 and the camera system 110a are connected by a network cable 114a and the HUB 120 and the camera system 110j are connected by a network cable 114b.

The server 130 processes image data with a plurality of viewpoints (frame with a plurality of viewpoints) transmitted from the camera systems 110a-110j, generates a three-dimensional model (in the following, described as "3D model") by shape estimation from the image data with a plurality of viewpoints, and so on. Further, the server 130 generates a time synchronization signal and performs synchronization control of the entire system. That is, it can be said that the server 130 is an information processing apparatus because the server 130 processes information. The HUB 120 and the server 130 are connected by a network cable 114c.

The database (in the following, described as "DB") 140 accumulates image data and model information sent from the server 130 and provides the accumulated image data and model information to the server 130 as needed. The server 130 and the DB 140 are connected by a network cable 114d.

The control device 150 comprehensively controls each of the camera systems 110a-111j and the server 130. Then, the control device 150 performs control for generating a virtual viewpoint video. The operation device 160 provides a user with a user interface unit (in the following, referred to as UI unit) through which the user operating the present camera system performs control for the control device 150. The HUB 120 and the control device 150 are connected by a network cable 114e.

The display device 170 is a device that displays an image, for example, such as a liquid crystal display, and displays an image that is sent from the control device 150. The control device 150 and the display device 170 are connected by a video cable 114f.

The timer device 180 is a timer that generates time information at the time of determining a game rule that is used in a game. That is, the timer device 180 times a predetermined time determined in advance. In the present embodiment, time information at the time of determining the 24-second rule or the like that is used in a game of basketball is generated. The predetermined time is set to the timer device 180 by a referee assistant, not shown schematically, or set automatically. The timer device 180 automatically performs a countdown and outputs the value as a count value (time information). That is, the timer device 180 times a time and outputs the timed time. The server 130 and the timer device 180 are connected by a network cable 114h.

In the virtual viewpoint image generation system shown in FIG. 1, although the plurality of the camera systems is connected by the daisy chain method, the connection may be the star connection in which the HUB 120 and each of the camera systems 110a-110j are connected directly. Further, in the virtual viewpoint image generation system, the number of camera systems is not limited to ten and the number may be smaller or larger than ten.

Here, the operation of the virtual viewpoint image generation system is explained. The image obtained by image capturing by the imaging unit 111a is transferred to the camera adaptor 112b of the camera system 110b through the network cable 113a after image processing, such as processing to separate the image into the image capturing-target object and the background, has been performed for the image by the camera adaptor 112a. The image capturing-target object is one of the objects as an image capture target. The image of the image capturing-target object from which the background is separated is particularly called a silhouette image and for example, in the silhouette image, the foreground is a white image and the background is a black image. The camera adaptor 112 generates the silhouette image, the image of the foreground, and the image of the background and transfers them. For example, it is possible to generate a silhouette image by a general method, such as the background difference method in which a difference between the captured image obtained by capturing the image capturing-target object and the background image obtained by performing image capturing in advance in a case where the image capturing-target object does not exist, such as before the start of the game, is calculated and the portion whose difference is larger than or equal to a threshold value is taken as a silhouette (foreground area). Of course, the method of generating a silhouette image is not limited to this. For example, it may also be possible to generate a silhouette image by using a method of recognizing the human body and the like. Similarly, the camera system 110b combines the image obtained by image capturing by the imaging unit 111b with the image obtained from the camera system 110a and transfers the combined image to the camera system 110c. By continuing the operation described previously, the images obtained by the imaging units in the camera systems 110a-110j are transferred from the camera system 110j to the HUB 120 via the network cable 114b and after that, the images are transferred to the server 130.

Next, the configuration and operation of the server 130 are explained. The server 130 performs processing of the data obtained from the camera system 110j. The server 130 has a time server function and transmits a time and a synchronization signal to each camera system 110 and the timer device 180. Each camera system 110 having received the time and the synchronization signal performs image capturing for each frame in synchronization with the same time by the ten imaging units 111a-111j. The timer device 180 synchronizes the value of a 24-second timer, which is displayed on the display device of the timer device 180 itself, with the signal received from the server 130. Further details will be described later by using a diagram.

(Arrangement of Imaging Units)

Figure 2:
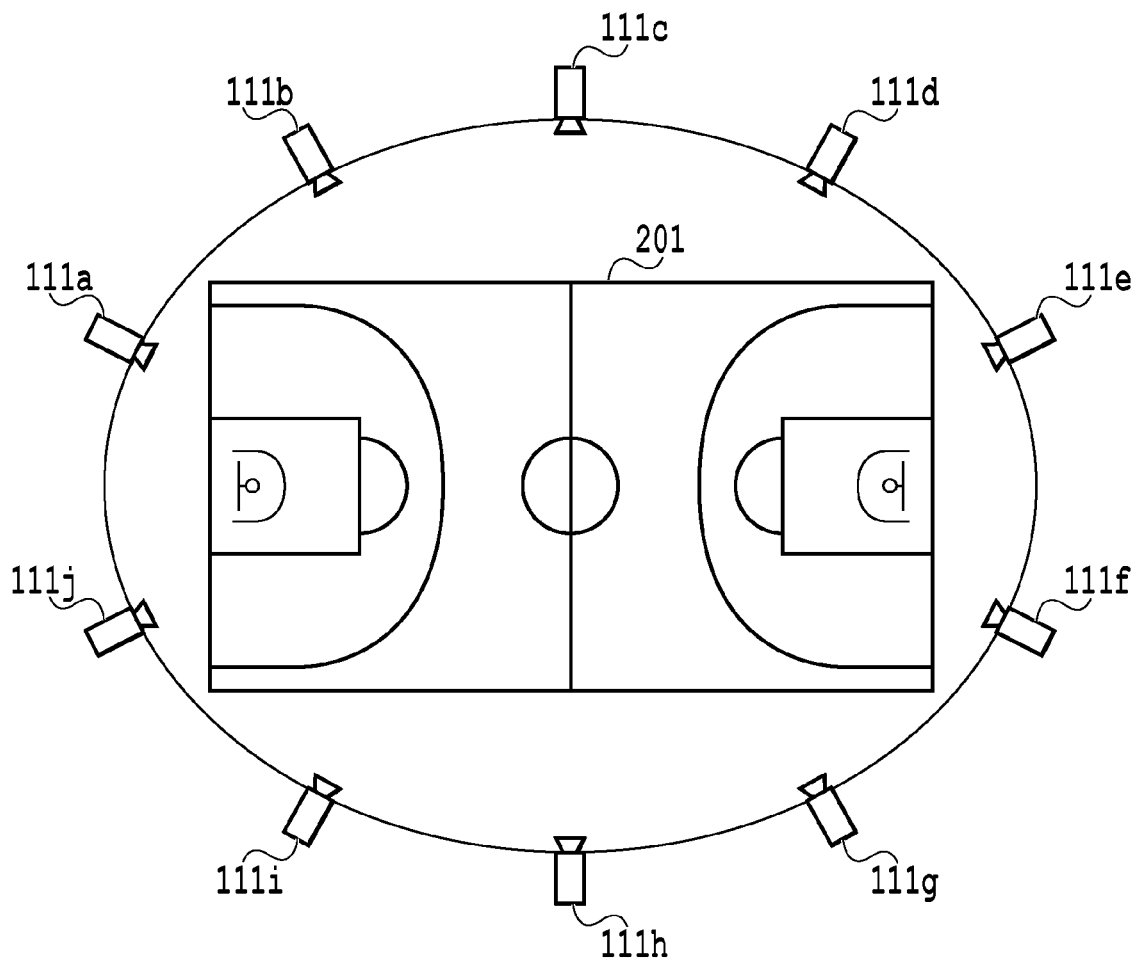
FIG. 2 is a schematic diagram showing an arrangement example of imaging units.

The arrangement of the imaging units of the camera system is explained by using a diagram. FIG. 2 is a diagram showing an arrangement example of the imaging units of the camera system. FIG. 2 shows the state where a basketball court (in the following, described as "court") 201 is viewed from directly above. As shown in FIG. 2, the imaging units 111a-111j of the camera systems 110a-110j are arranged around the court 201 and so as to be capable of capturing a desired position of the court 201. It is assumed that each of the imaging units 111a-111j is arranged at a certain height from the ground. The imaging units 111a-111j are arranged so as to be capable of capturing the entire area (three-dimensional area including height) in which an image capturing-target object on the court 201 moves.

(Configuration of Server)

Figure 3:
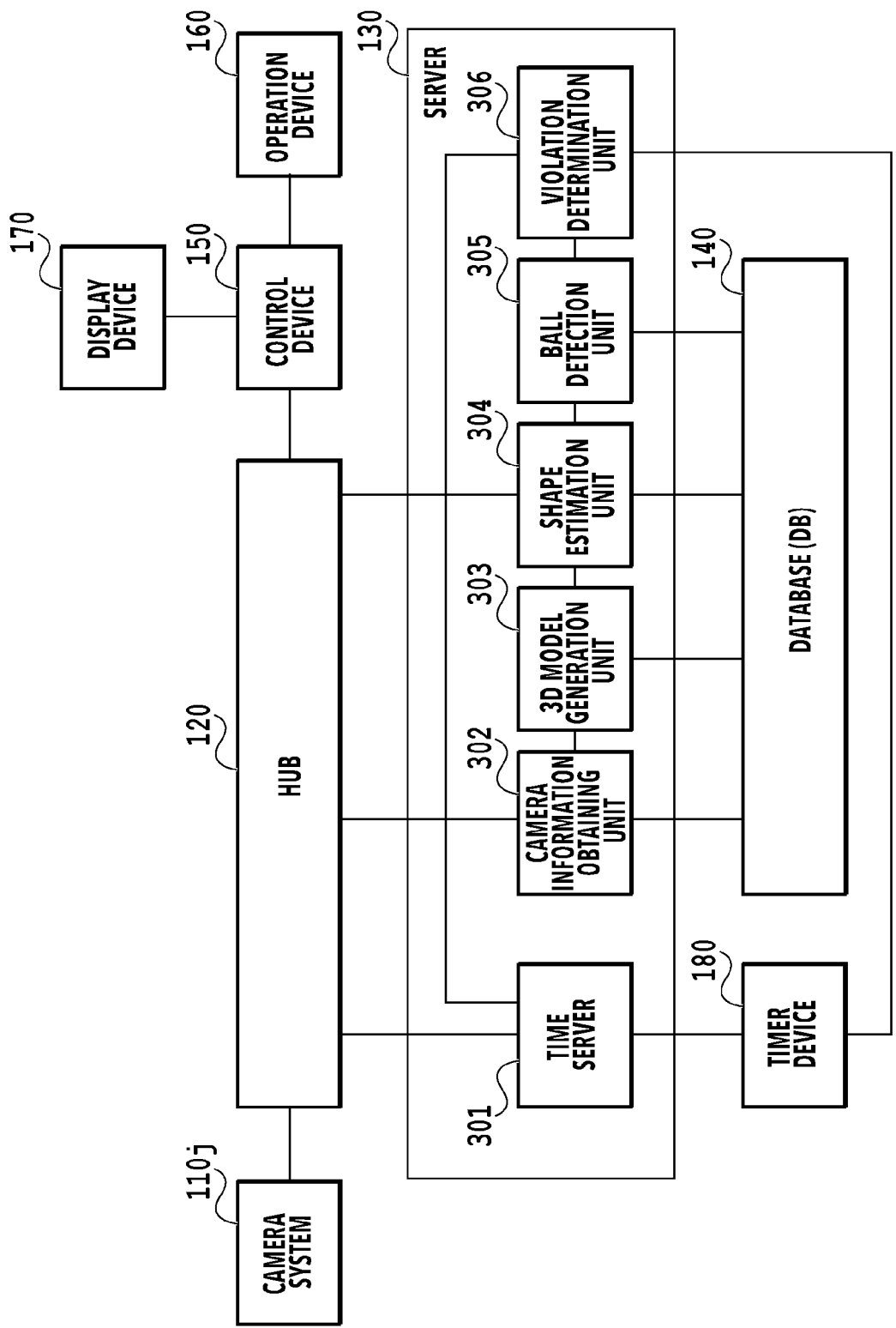
FIG. 3 is a block diagram showing a function configuration example of a server.

The configuration of the server 130 is explained by using a diagram. FIG. 3 is a diagram showing a configuration example of the server 130. As shown in FIG. 3, the server 130 has a time server 301, a camera information obtaining unit 302, a 3D model generation unit 303, a shape estimation unit 304, a ball detection unit 305, and a violation determination unit 306.

The time server 301 obtains time information for time synchronization for synchronizing the images (videos) obtained by the ten camera systems 110 shown in FIG. 1 performing image capturing. The time server 301 receives the world standard time by a GPS antenna, not shown schematically. Alternatively, the time server 301 internally generates its own time and transmits the time to each camera system 110. Further, in the present embodiment, the time server 301 receives the counter value from the timer device 180 used for the basketball game, combines the value with the time for time synchronization, and sends the combination to the camera information obtaining unit 302.

The camera information obtaining unit 302 obtains camera parameter information relating to image capturing, such as the current zoom value, focus value, and aperture value, of each of the imaging units 111a-111j and image data obtained by image capturing by each imaging unit from the ten imaging units 111a-111j. Here, the image obtained by image capturing by each of the imaging units 111a-111j is the image obtained by time-synchronized image capturing of the imaging unit based on the time for time synchronization transmitted from the time server 301.

The 3D model generation unit 303 generates a 3D model (three-dimensional shape data) of an image capturing-target object by using the camera parameter information obtained by the camera information obtaining unit 302 and the captured image with a plurality of viewpoints. That is, the 3D model generation unit 303 generates a 3D model corresponding to each of a plurality of objects in a fame with a plurality of viewpoints by using the frame. In the generation of a 3D model, the 3D model is generated by using, for example, a silhouette image of the image capturing-target object generated by the camera adaptor 112. By using the silhouette image generated from the image obtained by image capturing of all the imaging units and the camera parameter information, the 3D model of the image capturing-target object is generated. For the 3D model generation, it is possible to use, for example, the Visual Hull method. As a result of this processing, 3D data (set of points having three-dimensional coordinates) representing the 3D model of the image capturing-target object is obtained.

The shape estimation unit 304 estimates the size of the 3D model by using the camera parameter information obtained by the camera information obtaining unit 302 and the 3D model of the image capturing-target object generated by the 3D model generation unit 303.

The ball detection unit 305 determines whether or not the 3D model is a basketball by using the size of the 3D model estimated by the shape estimation unit 304 and information relating to the size of the detection-target basketball, which is set in advance. Details of the determination method will be described later.

Figure 4A:
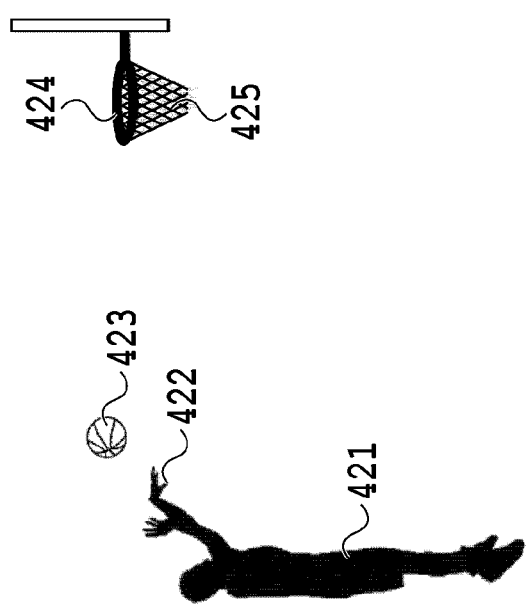
FIG. 4A and FIG. 4B are each a schematic diagram showing an image capturing-target object example.
Figure 4B:
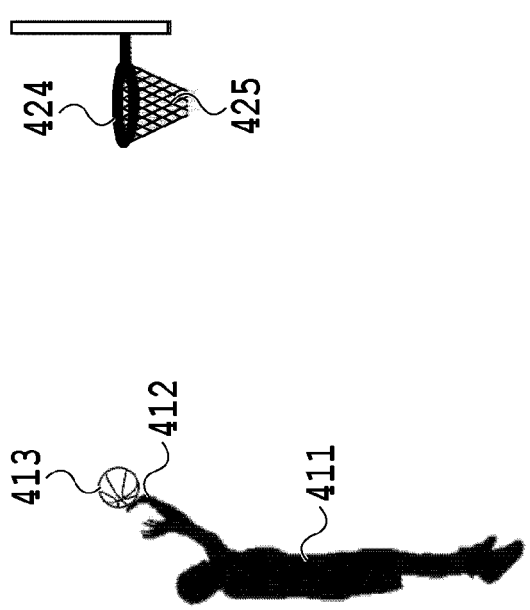

Here, by taking the game of basketball as an image capturing target, the positions of a player of interest and a ball handled by the player of interest, and the 24-second rule, which is one of violation targets, are explained by using diagrams. FIG. 4A and FIG. 4B are each a schematic diagram at the time of a certain player taking a shot in the game of basketball. FIG. 4A shows the state immediately before the shot and where the ball has not separated yet from the hand of the player of interest and FIG. 4B shows the state immediately after the shot and where the ball has separated from the hand of the player of interest. The game rules of basketball include, for example, the 24-second rule as a violation target. According to the 24-second rule, in a case where the player of interest controls a live ball on the court, on a condition that the following condition is not met, a violation is determined and the opponent team gets the control of the ball. That is, in a case where the condition that the team of the player of interest takes a shot within 24 seconds and the ball contacts with the ring or falls into the basket is not met, the opponent team gets the control of the ball. Here, what is important is whether the ball has separated from the hand of the player before the timer device that times 24 seconds counts the time "0". Consequently, as shown in FIG. 4A, in a case where a hand 412 of a player of interest 411 is still in contact with a ball 413, on a condition that the count of the timer device 180 reaches "0", the 24-second rule is violated and the opponent team gets the control of the ball. On the other hand, in a situation of the state as shown in FIG. 4B, in a case where the count of the timer device 180 reaches "0" at the instant a ball 423 has separated from a hand 422 of a player of interest 421, on a condition that the state is as follows, the 24-second rule is not violated. That is, in a case where the ball 423 contacts with a ring 424 or in a case where the ball falls in a basket 425 and the shot has succeeded, the 24-second rule is not violated. As described above, the count value of the timer device 180 and the position relationship between the player of interest and the ball handled by the player of interest are important.

Figure 5B:
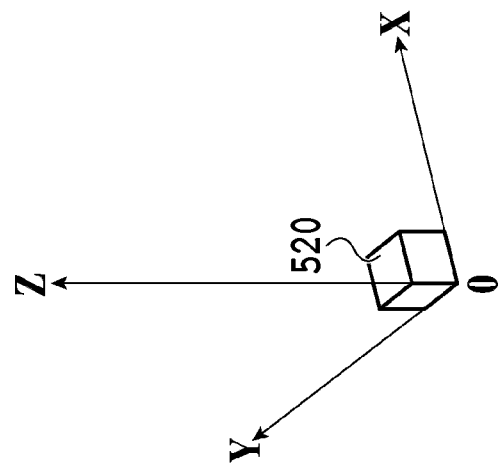
FIG. 5A and FIG. 5B are each a diagram explaining generation of a 3D model of a basketball court.
Figure 5A:
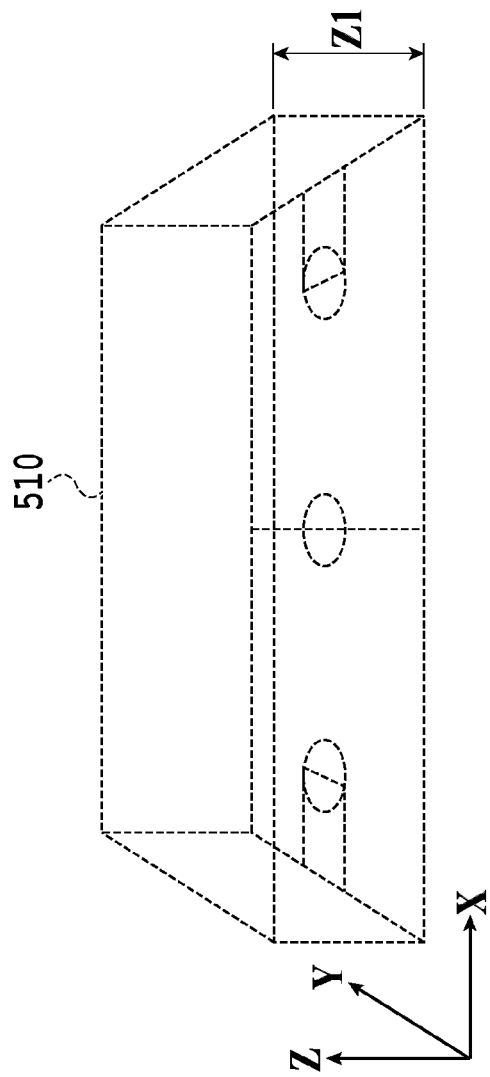

Here, the generation of a 3D model of a court is explained by using diagrams. FIG. 5A and FIG. 5B are each a diagram for explaining the generation of a 3D model of a court. As shown in FIG. 5A, in a case where the floor surface of a court is represented by X and Y coordinates and the position in the height direction is represented by a Z coordinate of three-dimensional coordinates, a cuboid consisting of the court surface on X- and Y-axes and a height Z1 is a processing-target space 510 in which an image capturing-target object is modeled. In FIG. 5A, the plurality of cameras arranged around the court is omitted. FIG. 5B is a schematic diagram representing a voxel 520. By the image data obtained by image capturing of the plurality of camera systems, the state is brought about where the place at which the image capturing-target object exists in the processing-target space 510 is filled with the voxel and the place at which the image capturing-target object does not exist, there is no voxel. The voxel 520 is the minimum unit at the time of modeling the image capturing-target object and as shown in FIG. 5B, the voxel represents the unit volume by a regular hexahedron and in the present embodiment, the voxel is taken as the minimum unit representing the model of the image capturing-target object.

Figure 6A:
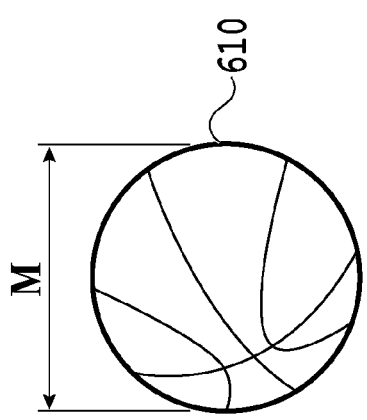
FIG. 6A to FIG. 6C are each a diagram explaining generation of a 3D model of a basketball.
Figure 6B:
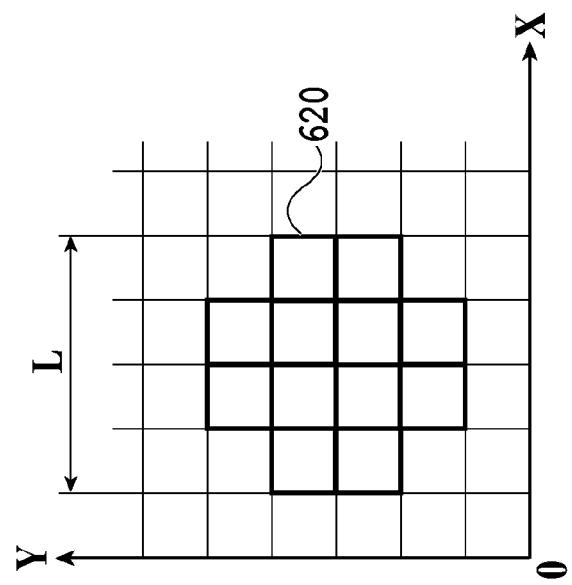
Figure 6C:
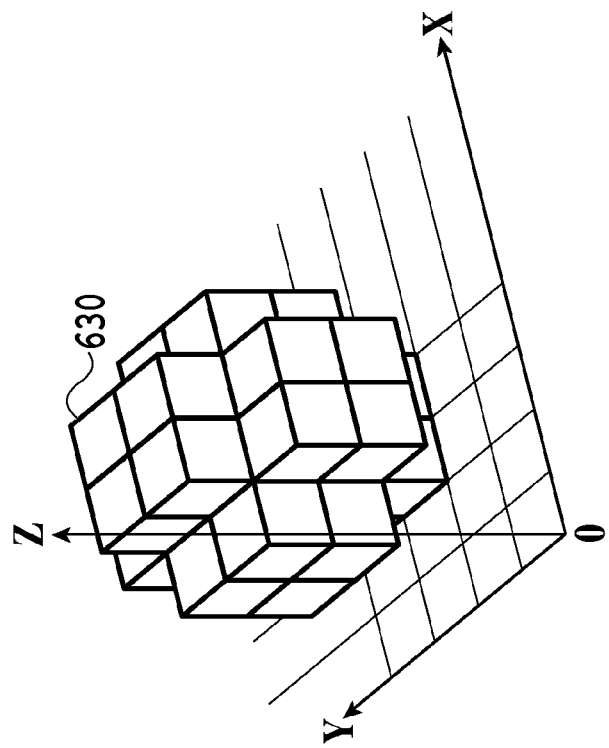

Here, the generation of a 3D model of a basketball is explained by using diagrams. FIG. 6A to FIG. 6C are each a diagram explaining the generation of a 3D model of a basketball. FIG. 6A shows an outline of a basketball, FIG. 6B shows a 3D model 620 of the basketball on the XY plane, and FIG. 6C shows a 3D model (voxel set) 630 of the basketball in the XYZ space. FIG. 6B and FIG. 6C are each a schematic diagram showing the basketball on three-dimensional coordinates at the time of modeling the image capturing-target object on three-dimensional coordinates and the basketball is viewed by changing the viewpoint in FIG. 6B and FIG. 6C, respectively. FIG. 6B and FIG. 6C show the basketball on the same coordinates.

As shown in FIG. 6A, it is assumed that a basketball 610 is the size whose diameter is M. As shown in FIG. 6B, the basketball is represented by voxels and the size of the 3D model 620 on the XY plane is taken as L. Here, it is assumed that the size M of the basketball 610 and the size L of the 3D model 620 on the XY plane satisfy a relationship of L>>M. The size L of the 3D model 620 on the XY plane of the basketball is the size including errors at the time of representing the basketball by voxels whose size is M of the actual basketball 610 and it is assumed that the size L is sufficiently large compared to the size M of the basketball 610.

Figure 7A:
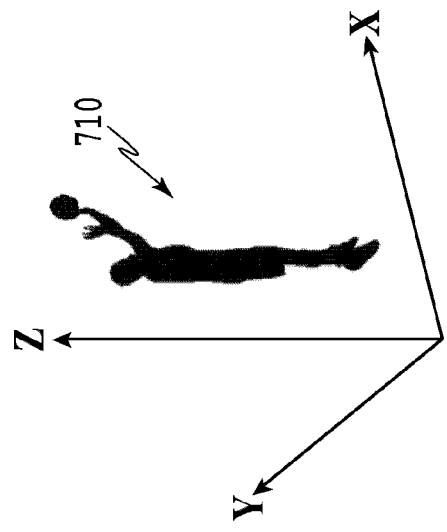
FIG. 7A to FIG. 7F are each a diagram explaining generation of a 3D model at the time of shot by a basketball player.
Figure 7B:
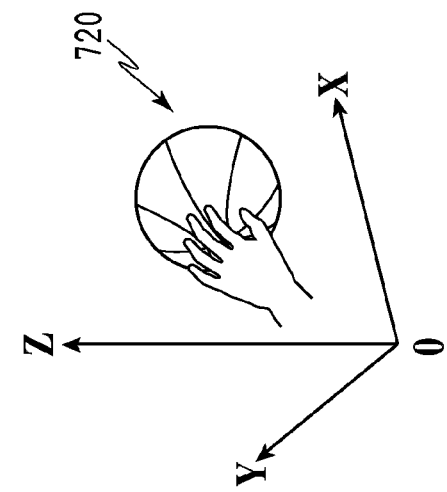
Figure 7C:
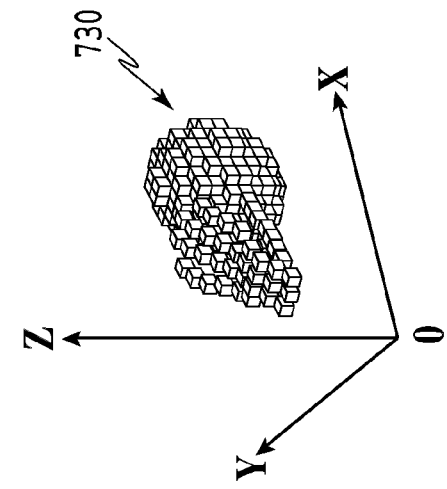

FIG. 7A to FIG. 7F are each a schematic diagram at the time of a certain player taking a shot in the game of basketball. FIG. 7A, FIG. 7B, and FIG. 7C are diagrams corresponding to FIG. 4A and FIG. 7D, FIG. 7E, and FIG. 7F are diagrams corresponding to FIG. 4B. FIG. 7A shows a case where a silhouette image 710 in FIG. 4A is mapped onto three-dimensional coordinates. FIG. 7B shows a case where an image 720 corresponding to FIG. 7A, which is obtained by extracting the portions of the hand of the player and the ball, is mapped onto three-dimensional coordinates. FIG. 7C shows a case where a 3D model (voxel set) 730 of the image 720 in FIG. 7B is mapped onto three-dimensional coordinates.

Figure 7D:
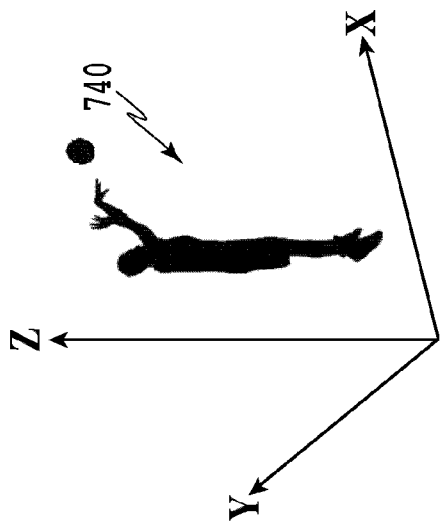
Figure 7E:
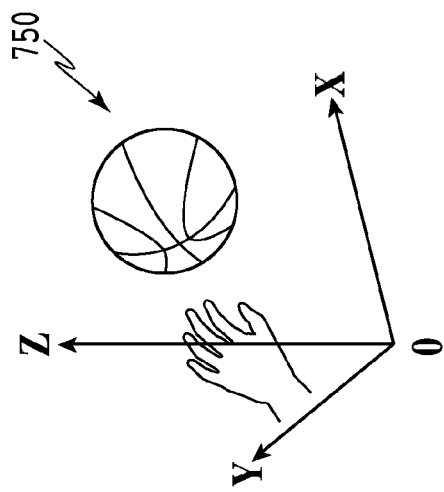
Figure 7F:
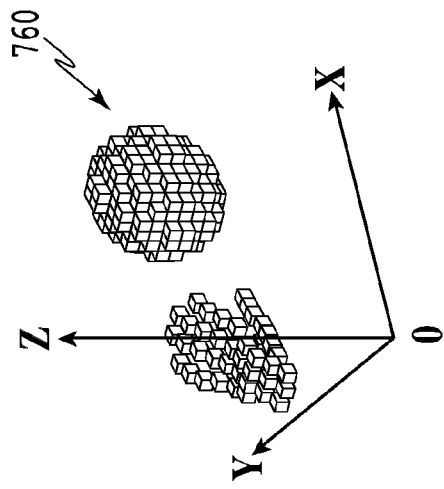

Similarly, FIG. 7D shows a case where a silhouette image 740 in FIG. 4B is mapped onto three-dimensional coordinates. FIG. 7E shows a case where an image 750 corresponding to FIG. 7D, which is obtained by extracting the portions of the hand of the player and the ball, is mapped onto three-dimensional coordinates. FIG. 7F shows a case where a 3D model (voxel set) 760 of the image 750 in FIG. 7E is mapped onto three-dimensional coordinates. The voxel size shown in FIG. 6A to FIG. 6C and FIG. 7A to FIG. 7F is represented as one whose size is larger than the actual size in order to make explanation easier-to-understand.

Figure 8:
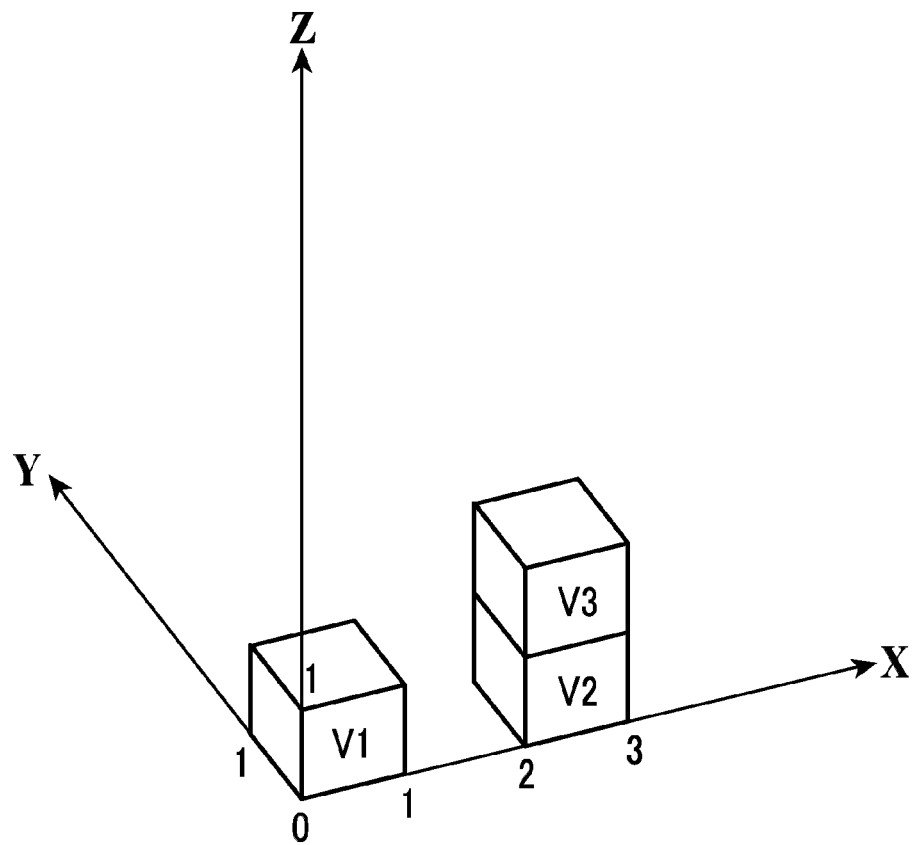
FIG. 8 is a diagram explaining generation of a 3D model.

Here, the three-dimensional coordinate position of a voxel at the time of mapping the voxel onto three-dimensional coordinates is explained by using a diagram. FIG. 8 is a schematic diagram in which a voxel is mapped onto three-dimensional coordinates as in the case of FIG. 5B. Each of a voxel V1, a voxel V2, and a voxel V3 consists of a regular hexahedron whose length of each side is "1" and it is assumed that the position of the voxel is represented by three-dimensional coordinates of the vertex the closest to an origin 0 among the eight vertexes of the regular hexahedron. According to this rule, it is possible to represent three-dimensional coordinates (x, y, z) of each of the voxel V1, the voxel V2, and the voxel V3 as (0, 0, 0), (2, 0, 0), and (2, 0, 1), respectively.

(Presence/Absence of Voxel at the Time of Modeling Image Capturing-Target Object)

Figures 9A, 9B:
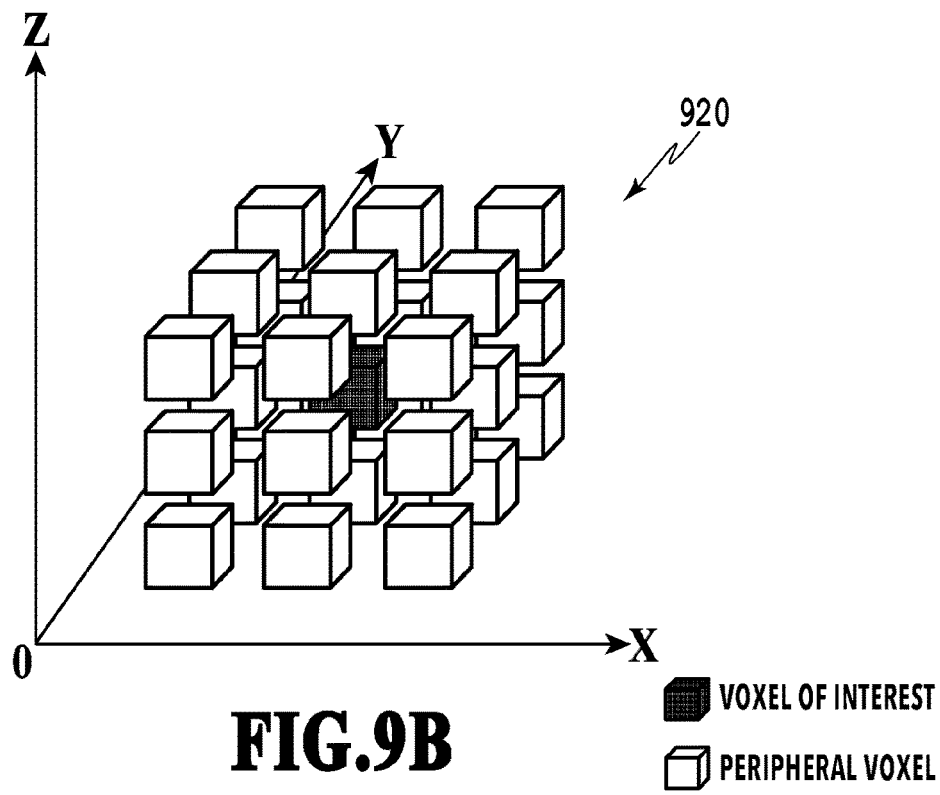
FIG. 9A and FIG. 9B are each a diagram explaining the presence/absence of a voxel at the time of modeling an image capturing-target object.

The presence/absence of a voxel at the time of modeling an image capturing-target object is explained by using diagrams. FIG. 9A and FIG. 9B are each a diagram for explaining the presence/absence of a voxel at the time of modeling an image capturing-target object. FIG. 9A shows a table that puts together information corresponding to one frame and relating to a voxel for each three-dimensional coordinates of a voxel explained in FIG. 8 and FIG. 9B shows a relationship between a voxel of interest and peripheral voxels.

As shown in FIG. 9A, a table 910 includes Voxel Presence/absence 912, Peripheral Voxel Presence/absence 913, and Image Capturing-target Object Group 914 for all three-dimensional coordinates 911 in the processing-target space. Voxel Presence/absence 912 indicates whether or not there is a voxel at target coordinates and in a case where there is a voxel at the target coordinates. "1" is stored and in a case where there is no voxel, "0" is stored. Peripheral Voxel Presence/absence 913 indicates whether or not there is a voxel at each coordinates of 26 places (SV1 to SV26) around the target coordinates. In Peripheral Voxel Presence/absence 913, in a case where there is a voxel at each coordinates of the 26 places around the target coordinates, "1" is stored and in a case where there is no voxel, "0" is stored. Image Capturing-target Object Group 914 indicates a group to which a voxel belongs in a case where the voxel exists at the target coordinates. The table 910 includes data generated by the shape estimation unit 304 with reference to point cloud data generated by the 3D model generation unit 303 and is stored in the DB 140. The table 910 (information relating to voxels) stored in the DB 140 is read by the ball detection unit 305 and used at the time of performing processing to detect a ball. For each voxel, adjacent voxel positions exist at 26 places in three-dimensional directions around the self-voxel (voxel of interest). The table 910 shows a relationship between the self-voxel and each of the peripheral voxels (also referred to as adjacent voxels) at SV1 to SV25 in order of relative coordinates (−1, −1, −1), (0, −1, −1), (1, −1, −1), (−1, 0, −1), (0, 0, −1), (1, 0, −1), (−1, 1, −1), (0, 1, −1), (1, 1, 0), (−1, −1, 0), (0, −1, 0), (1, −1, 0), (−1, 0, 0), (1, 0, 0), (−1, 1, −1), (0, 1, −1), (1, 1, 0), (−1, 1, 0), (0, 1, 0), (1, 1, 0), (−1, −1, 1), (0, −1, 1), (1, −1, 1), (−1, 0, 1), (0, 0, 1), (1, 0, 1), (−1, 1, 1), (0, 1, 1), (1, 1, 1) in a case where the coordinates of the self-voxel are taken to be (0, 0, 0). Note that the endpoint of the three-dimensional coordinates is excluded. FIG. 9B shows this. In FIG. 9B, voxels are represented with a predetermined distance apart from one another for easier explanation and the self-voxel (voxel of interest) is represented in gray and 26 peripheral pixels are represented in white. For example, in FIG. 8, although there are only seven voxel positions around the self-voxel because the voxel V1 is at the endpoint of three-dimensional coordinates, in a case of having a think along the example shown in FIG. 8 actually, there is no peripheral voxel, and therefore, in the table in FIG. 9A, in all the fields of "Peripheral Voxel Presence/absence", "0" is stored. Similarly, the voxel V2 is located at the endpoint of three-dimensional coordinates, and therefore, the number of peripheral voxels is 11 and among them, the voxel existing as the peripheral voxel is only the voxel 3 and "1" is stored only in the corresponding field and in the other fields, "0" is stored. Although not explained here, each of the coordinates of the 26 peripheral voxels for each voxel in the table is such that the values of x-, y-, and z-coordinates are a combination of ±1 for the self-voxel. The voxel V3 is also the same. Here, it is assumed that in a case where each voxel exists as the peripheral voxel, the voxel is regarded as part of the same image capturing-target object and the image capturing-target object group is represented by the same symbol. Here, the voxel V1 belongs to a group A and the voxel V2 and the voxel V3 belong to a group B.

(Estimation of Size of Object)

Figure 10:
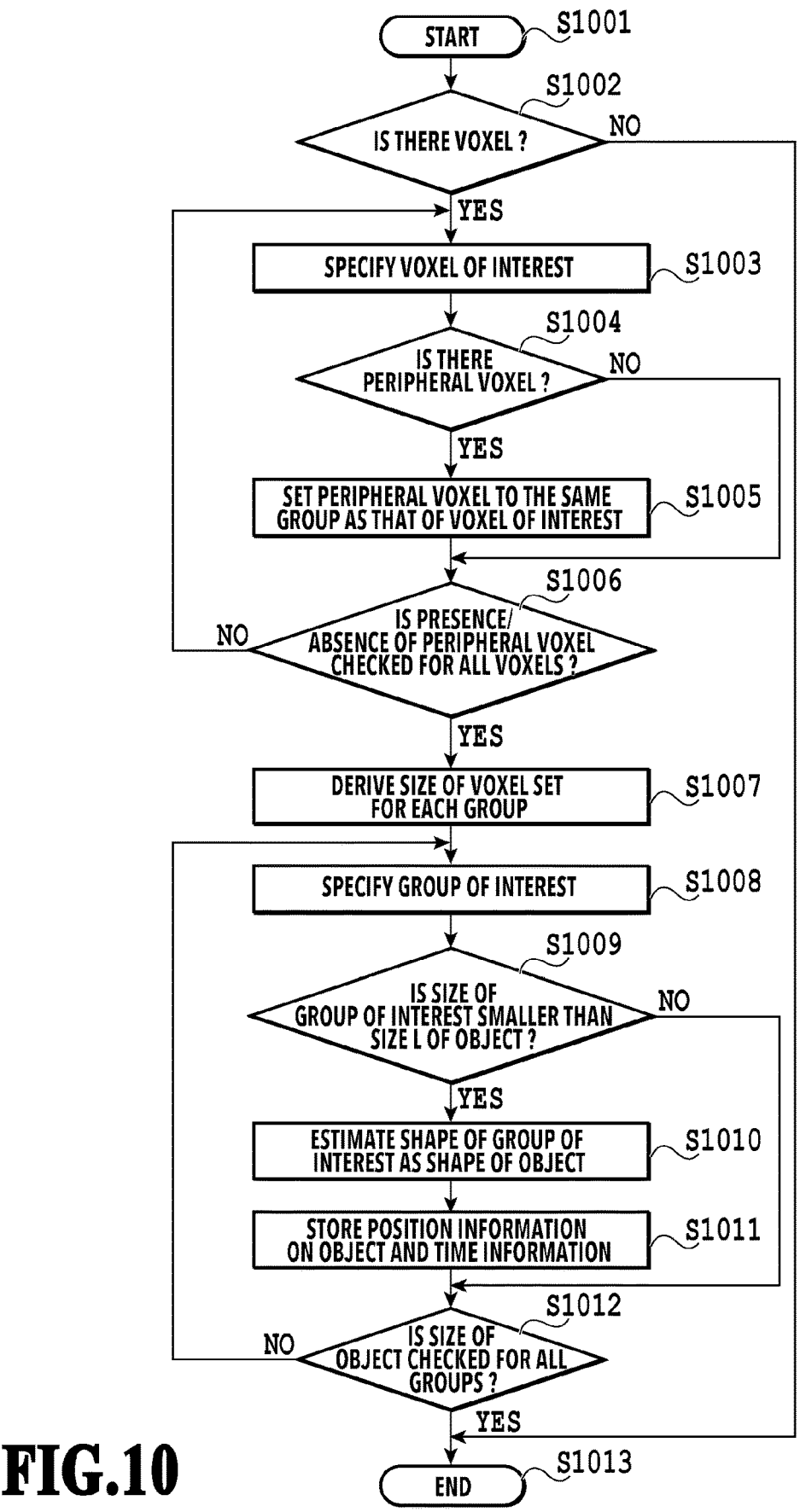
FIG. 10 is a flowchart showing a flow of processing to estimate a size of an object.

Processing to estimate a size of an object, which is performed by the shape estimation unit 304, is explained by using diagrams. FIG. 10 is the flowchart showing a flow of processing to estimate a size of an object. The series of processing shown in the flowchart in FIG. 10 is performed by the CPU loading a program code stored in the ROM onto the RAM and executing the program code. Further, it may also be possible to implement part or all of the functions at the steps in FIG. 10 by hardware, such as an ASIC and an electronic circuit. Symbol "S" in explanation of each piece of processing means that the step is a step in the flowchart and this also applies to subsequent flowcharts.

First, image capturing by a plurality of cameras is started and in a case where the operation by the camera information obtaining unit 302 and the 3D model generation unit 303 is completed, the shape estimation unit 304 starts the operation (S1001). That is, the shape estimation unit 304 obtains the camera parameter information obtained by the camera information obtaining unit 302 and the 3D model of the image capturing-target object generated by the 3D model generation unit 303. It may also be possible to obtain the camera parameter information and the 3D model of the image capturing-target object from each function unit or obtain from the DB 140.

At S1002, the shape estimation unit 304 determines whether or not there is an unprocessed voxel within the processing-target space for each voxel. In the example in FIG. 5A, the processing-target space is the portion of the volume of the cuboid consisting of the court surface on the X- and Y-axes and "Z1" as the value in the +z-direction, which is the height direction thereof. The voxel unit is, for example, the voxel shown in FIG. 5B. Based on the table in FIG. 9A, whether or not there is a voxel at each position is determined. The search of the presence/absence of a voxel is performed, for example, in the order indicated below. First, the search is performed in the X-axis direction from an origin (0, 0, 0). Then, in a case where the search of (Y, Z)=(0, 0) is completed, the search is performed in the X-axis direction from (Y, Z)=(1, 0). Then, in a case where the search is completed at the end of the Y-axis in the order such as this, the search is performed in the X-axis direction from (Y, Z)=(0, 1). Then, in a case where the search of (Y, Z)=(0, 1) is completed, the search is performed in the X-axis direction from (Y, Z)=(1, 1). In a case where the search is completed at the end of the Y-axis in the order such as this, the search is performed from the coordinates to which 1 is added in the Z-axis coordinate. In the order such as this, the search for the entire processing-target space is performed. The order of searching the presence/absence of a voxel is not limited to this. In a case where determination results that there is a voxel are obtained (YES at S1002), the processing is moved to S1003. On the other hand, in a case where determination results that there is no voxel are obtained (NO at S1002), the processing is moved to S1013 and the flow shown in FIG. 10 is terminated.

At S1003, the shape estimation unit 304 specifies a voxel of interest that is a processing target.

At S1004, the shape estimation unit 304 determines whether or not there is a voxel (peripheral voxel) at 26 positions surrounding the voxel of interest specified at S1003. Note that there is a case where the number of positions is less than 26 depending on the position of the voxel of interest. Here, in a case where determination results that there is no voxel at each of the 26 positions surrounding the voxel of interest are obtained (NO at S1004), the processing is moved to S1006. In a case where determination results that there is a voxel at one or more of the 26 positions surrounding the voxel of interest are obtained (YES at S1004), the processing is moved to S1005.

At S1005, the shape estimation unit 304 sets the peripheral voxel (adjacent voxel) located at the position at which it is determined that there is a voxel at S1004 to the same group as that of the voxel of interest.

At S1006, the shape estimation unit 304 determines whether or not the presence/absence of a peripheral voxel is checked for all the voxels detected from the processing-target space. In a case where determination results that the presence/absence of a peripheral voxel is checked for all the voxels are obtained (YES at S1006), the processing is moved to S1007. On the other hand, in a case where determination results that the presence/absence of a peripheral voxel is not checked for all the voxels are obtained (NO at S1006), the processing is returned to S1003. Then, the voxel of interest is specified from among unprocessed voxels at S1003 and the series of processing from S1004 to S1006 is performed.

At S1007, the shape estimation unit 304 derives the size of the voxel set for each group. In the voxel set, which is the cluster of the voxels set to the same group at S1005, the maximum value of the length of each axis is found from the coordinate points of the three-dimensional coordinates located at the endmost positions in the ±X-direction, Y-direction, and ±Z-direction, respectively. Here, this is explained by taking the X-axis direction as an example. In a certain group, in a case where the coordinate point whose values of (x, y, z) are (3, 0, 1) has the smallest value as the value of x and the coordinate point whose values of (x, y, z) are (10, 4, 3) has the largest value as the value of x, the length in the x-direction is 10−3=7 and the length is "7". By calculating the lengths in the y-axis direction and the z-axis direction similarly, it is possible to derive the size of the group as a cuboid.

At S1008, the shape estimation unit 304 specifies a group of interest that is a processing target.

At S1009, the shape estimation unit 304 determines whether or not the size of the group of interest is small compared to the size L of the object obtained in advance. In a case where determination results that the size of the group of interest is small compared to the size L of the object (object of interest) are obtained (YES at S1009), the processing is moved to S1010. On the other hand, in a case where determination results that the size of the group of interest is not small compared to the size L of the object (object of interest) are obtained (NO at S1009), the processing is moved to S1012. Specifically, whether the size of the voxel set corresponding to the group of interest is smaller than the size "L" of the basketball represented by voxels in FIG. 6B is checked. Here, in order to check the size of the basketball, in the group of the cluster of voxels set to the same group at S1005, the maximum value of the length of each axis is found from the coordinate points of the three-dimensional coordinates located at the endmost positions in the ±X-direction, ±Y-direction, and ±Z-direction, respectively. In a case where there is an image capturing-target object smaller than "L", that is, being smaller than L means being small in each of the x-, y-, and z-directions.

At S1010, the shape estimation unit 304 estimates the shape of the group of interest as the shape of the object.

At S1011, the shape estimation unit 304 stores position information indicating the position of the group of interest estimated as the object (in the present embodiment, basketball) at S1010. Further, the shape estimation unit 304 stores time information associated with the processing-target frame and including the time generated by the server 130 and the count value counted by the timer device 180 in the DB 140 and the like. That is, the position information on the object of interest, the count value, and the time of the image capturing-target game are stored in the DB 140 and the like in association with one another. Although the position information may be, for example, coordinate information on any voxel in the voxel set corresponding to the group of interest, it is assumed that the coordinate information is that on the vertex the closest to the origin among the vertexes of the voxel the closest to the origin of the three-dimensional coordinates as explained in FIG. 8. This is not limited and the position of the object may be, for example, the centroid of the position of each voxel.

At S1012, the shape estimation unit 304 determines whether or not the size of the object is checked for all the groups. In a case where determination results that the size of the object is not checked for all the groups are obtained (NO at S1012), the processing is returned to S1008. Then, the group of interest is specified from unprocessed groups at S1008 and the series of processing from S1009 to S1012 is performed. On the other hand, in a case where determination results that the size of the object is checked for all the groups are obtained (YES at S1012), the processing is moved to S1013 and the flow shown in FIG. 10 is terminated.

By performing the flow shown in FIG. 10 described above for each frame and comparing the size of the group (voxel set) and the size of the object obtained in advance, the position of the basketball at each time and whether or not the basketball is held by a player are known. Due to this, it can be said that it is possible for the shape estimation unit 304 to specify that a specific object and another object are in contact with each other. That is, it is possible to specify the position of the basketball in a frame. In other words, based on the results of the comparison between the size of the object estimated by the shape estimation unit 304 and a predetermined reference value, it is possible to specify the position of a specific object captured by the plurality of imaging apparatuses.

Explanation is returned to FIG. 3. The violation determination unit 306 determines whether or not there is a foul by using the position relationship between the player and the basketball and the count value of the timer device 180 and sends the determination results to the display device 170 via the HUB 120 and the control device 150. The display device 170 displays the sent determination results. A case where the foul target is taken to be the 24-second rule is explained by using a diagram.

(Processing Performed by Server)

Figure 11:
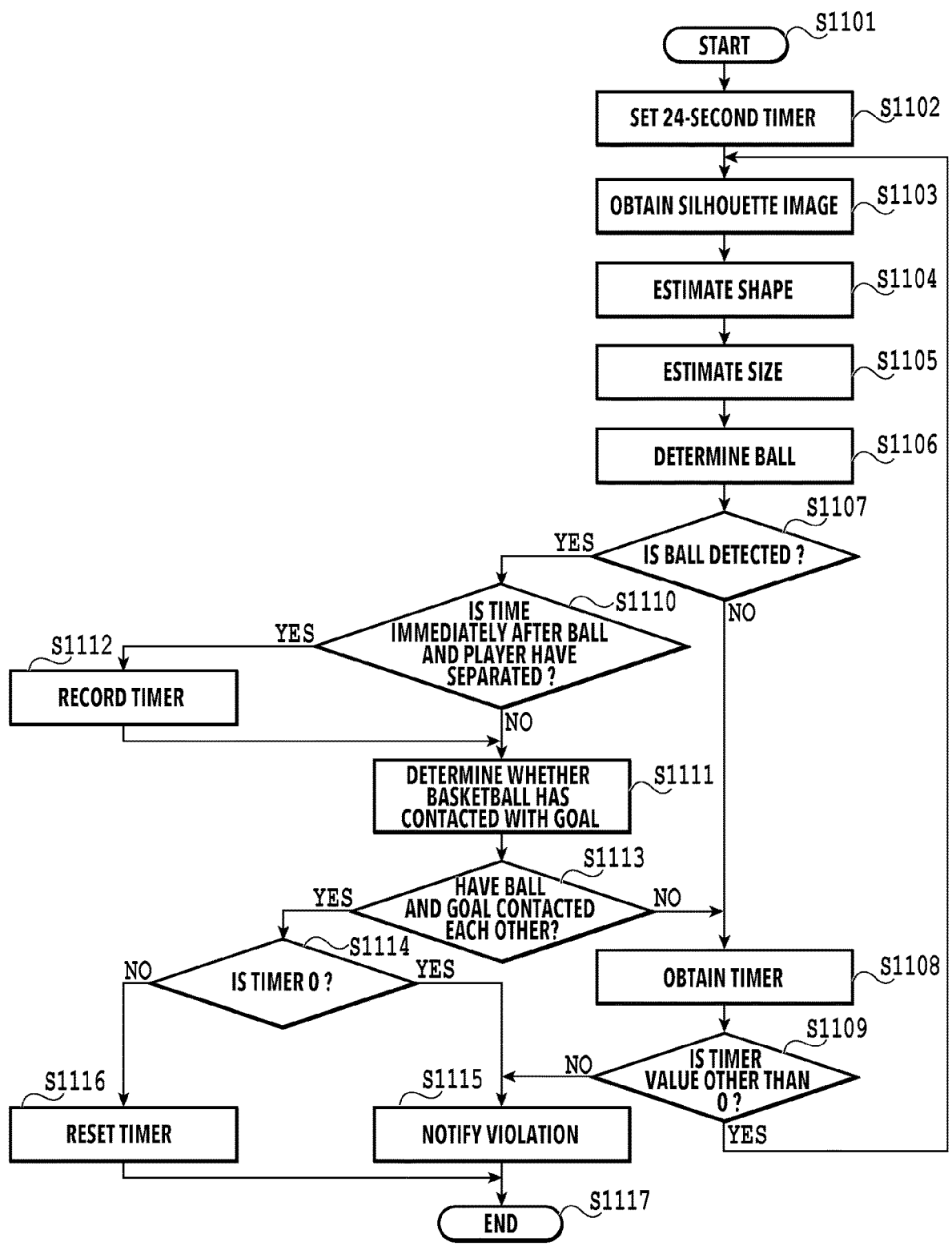
FIG. 11 is a flowchart showing a flow of processing to determine a violation in basketball.

Processing performed by the server 130 is explained by using a diagram. FIG. 11 is a flowchart showing a flow of processing performed by the server 130. Here, a case is explained where the 24-second rule of basketball is applied as a violation target.

First, at the point in time at which an attack of one of teams begins in a processing-target basketball game, the flow shown in FIG. 11 is started (S1101).

At S1102, at the point in time at which an attack of one of teams begins in the basketball game, the counter value of the timer device 180 is set to 24 seconds. The timer of 24 seconds to the timer device 180 is set manually by, for example, a referee assistant. In a case where the counter value is set in this manner, the timer device 180 starts count.

At S1103, the camera information obtaining unit 302 obtains a silhouette image from the camera system 110j.

At S1104, the 3D model generation unit 303 estimates the shape of an image capturing-target object. Specifically, the 3D model generation unit 303 generates a 3D model of an image capturing-target object by using the silhouette image obtained by the camera information obtaining unit 302.

At S1105, the shape estimation unit 304 estimates the size of the image capturing-target object. Specifically, the shape estimation unit 304 determines the size from the 3D model (voxel set) of the image capturing-target object generated at S1104. The determination method is as follows. First, the presence/absence of a voxel at all the coordinate positions of the cuboid shown in FIG. 5A and the presence/absence of a voxel on the periphery thereof are checked. The checking method is performed by checking the presence/absence of a white voxel at the 26 points on the periphery at the time of focusing attention on the gray voxel in FIG. 9B. The table 910 in FIG. 9A shows this. Then, the group is specified for each voxel and the size of the voxel set (image capturing-target object) is determined for each group. The detailed processing at this S1105 is the same as that at S1007 described in the flowchart in FIG. 10 described previously.

At S1106, the shape estimation unit 304 checks whether there is an image capturing-target object whose size is smaller than the size "L" of the basketball represented by voxels shown in FIG. 6B. The detailed processing at this S1106 is the same as that at S1009 and S1010 described in the flowchart in FIG. 10 described previously.

At S1107, whether or not the basketball is detected is determined. Specifically, in a case where there is an image capturing-target object smaller than "L" (YES at S1107), the ball detection unit 305 determines that the image capturing-target object is the basketball and moves the processing to S1110. Being "smaller than L" means being small in each of the x-, y-, and z-directions. On the other hand, in a case where there is no image capturing-target object smaller than "L" (NO at S1107), the processing is moved to S1108. That is, processing is performed in order for the successive frames, and therefore, that the basketball is detected represents that the basketball has separated from the player.

At S1108, the violation determination unit 306 obtains the counter value of the timer device 180.

At S1109, the violation determination unit 306 determines whether or not the counter value obtained at S1108 is "0". That is, the violation determination unit 306 determines whether or not a predetermined time has elapsed. In a case where determination results that the counter value obtained at S1108 is not "0" are obtained (YES at S1109), the processing is returned to S1103 and the series of processing at S1103 and subsequent steps is performed for the next frame. On the other hand, in a case where determination results that the counter value obtained at S1108 is "0" are obtained (NO at S1109), the processing is moved to S1115.

At S1110, the violation determination unit 306 determines whether or not the present point in time is the time immediately after the basketball and the player of the attacking side have separated, for example, such as the time immediately after the player of the attacking side has taken a shot from the times before and after the 3D model generation. Specifically, based on the processing results of the ball detection processing for the data corresponding to the processing-target frame (frame of interest) and the data corresponding to the preceding frame, whether or not the present point in time is the time immediately after the basketball and the player have separated. In a case where in the processing for the data of the preceding frame, no ball is detected and in the processing for the data of the frame of interest, the ball is detected and determination results that the present point in time is the time immediately after the basketball and the player have separated are obtained (YES at S110), the processing is moved to S1112. Then, at S1112, the violation determination unit 306 obtains the counter value of the timer device 180 and records it in the DB 140. On the other hand, in a case where the basketball is detected both in the processing for the data of the preceding frame and in the processing for the data of the frame of interest and determination results that the present point in time is not the time immediately after the basketball and the player have separated are obtained (NO at S1110), the processing is moved to S111.

At S1111, the violation determination unit 306 determines whether the basketball thrown by the player has contacted with the goal ring or whether the shot has succeeded. It is possible to determine the presence/absence of the contact between the basketball and the goal ring by determining whether or not there is a contact between each piece of position information and the 3D model. The coordinates of the goal are those already known on the x-, y-, and z-coordinates, and therefore, it is possible to easily determine whether the voxels the size of the basketball have contacted with the goal or whether they have fallen into the basket because the position coordinates of the ball are known, for example, from the table 910 shown in FIG. 9A. Specifically, the position information on the basketball at the time of determination at S1106 and the position information on the goal ring stored in advance in the DB 117 are used and in a case where both pieces of position information include position information indicating an adjacent position relationship, it is determined that the basketball and the goal ring have come into contact with each other. Further, in a case where there is a portion at which the area surrounded by the position information on the goal ring intersects with the area surrounded by the position information on the basketball, it is determined that the basketball has fallen into the basket. In a case where none of these conditions is met, it is determined that the basketball has not contacted with the goal ring and the basketball has not fallen into the basket.

At S1113, the violation determination unit 306 determines whether or not the basketball and the goal ring have contacted with each other. In a case where determination results that the basketball and the goal ring have contacted with each other are obtained (YES at S1113), the processing is moved to S1114. On the other hand, in a case where determination results that the basketball and the goal ring have not contacted with each other are obtained (NO at S1113), the processing is moved to S1108. By this processing, whether or not a player throws the basketball (takes a shot or makes a pass) and the basketball contacts with the goal ring within a certain time is determined.

At S1114, the violation determination unit 306 determines whether or not the counter value of the timer device 180 at the point in time at which the basketball has contacted with the goal ring is "0". In a case where determination results that the counter value of the timer device 180 is "0" are obtained (YES at S1114), the processing is moved to S1115. On the other hand, in a case where determination results that the counter value of the timer device 180 is not "0" are obtained (NO at S1114), the processing is moved to S1116.

At S1115, the violation determination unit 306 keeps a record to the effect that a violation has occurred and notifies the referee of the violation. The method of giving a notification to the referee may be a method of giving a notification using a device capable of displaying an image, such as a user interface image, or a message, or a method of giving a notification using an alert device (not shown schematically) that issues an alert. After the notification is completed, the processing is moved to S1117.

At S1116, the violation determination unit 306 resets the counter value. That is, by the violation determination unit 306, it is determined that no violation has occurred against the 24-second rule in the series of play.

At S1117, the violation determination unit 306 terminates the flow shown in FIG. 11.

Further, at S1111, although it is assumed that it is possible for the violation determination unit 306 to determine at which place on the x-, y-, and z-coordinates the basketball is located from FIG. 9A, this is not limited. For example, it may also be possible to find the position of an image capturing-target object having a unique size, not limited to the basketball, by specifying the image capturing-target object from the size of the image capturing-target object of the cluster of voxels (voxel set) using information, such as a voxel set.

As explained above, according to the system that generates a virtual viewpoint image using a plurality of cameras arranged around an image capturing-target object, it is possible to obtain the following effects. That is, in the process (stage) before generating a virtual viewpoint image, by correlating the size of a model at the point in time of generating a 3D model of an image capturing-target object with the game time, it is possible to obtain an image capable of appropriately assisting a referee in performing determination. Due to this, it is possible to determine a violation against the rules of the basketball game.

Further, according to the present embodiment, by successively measuring the size of the model of each image capturing-target object, which is generated at the time of generating a virtual viewpoint image from image data of the image capturing-target object captured by a plurality of imaging units, it is possible to utilize the measurement results for a referee assistance device that performs referee assistance of the game.

The application target of the system of the present embodiment is not limited to the 24-second rule of basketball. It is also possible to apply the system of the present embodiment to, for example, the 3-second overtime, which is another violation target of the basketball game. Further, it is also possible to apply the system of the present embodiment to, for example, determination processing of offside in soccer, which is a game other than the basketball game. Furthermore, it is also possible to track the locus of a ball in a time series.

Fouls/violations for each game to which the system of the present embodiment can be applied are explained by using a diagram. FIG. 12 is a table in which fouls/violations for each game are enumerated. As shown in FIG. 12, a table 1200 includes information relating to Game 1201, which is the image capturing target, and Foul/Violation 1202, which is the target. In the table 1200, as regards Game 1201, games, such as basketball, soccer, and handball, are stored.

As regards Foul/Violation 1202, for basketball, information, such as "24-second rule", "8-second rule", "5-second rule". "3-second rule". "Traveling", and "Double dribble" is stored. That is, information indicating a violation against the game rule of basketball is stored, which is determined in a case where the ball detected by the ball detection unit 305 does not exist in a predetermined area on the court at the point in time of timing that eight seconds have elapsed from the start of the attack by one of teams by the timer device 180. Information indicating a violation against the game rule of basketball is stored, which is determined in a case where the ball detected by the ball detection unit 305 is in contact with a player at the point in time of timing that five seconds have elapsed from the delivery of the ball from the referee to the player by the timer device 180.

Further, for soccer, information, such as "Offside" and "Hands", is stored.

Furthermore, for handball, information, such as "7-meter throw", "Overtime", "Overstep", and "Double dribble", is stored. Information indicating a violation against the game rule of handball is stored, which is determined in a case where, at the point in time of timing that three seconds have elapsed from the time at which the ball detected by the ball detection unit 305 contacts with a player of handball by the timer device 180, the ball and the player are in contact with each other.

By specifying in advance a flow that is fit to each rule and storing the flow, for example, in the DB 140 of the present system, it is also made possible to efficiently perform referee assistance in accordance with each game. That is, as shown in FIG. 12, as regards each game, such as basketball and handball, it may also be possible to store in advance data that is associated with a predetermined rule that utilizes position information and time information for determination of a referee in the DB 140 in the format of a table or the like.

In the present embodiment, although the case is explained where the event that has occurred in the game of basketball is interpreted in more detail, the case is not limited to this. It may also be possible to apply the present embodiment to a case where an event that has occurred in another ball game, such as soccer and tennis, is interpreted in more detail.

Further, it may also be possible to apply the present embodiment to a case where an event that has occurred in a game in which no ball is used, such as archery and Japanese archery, is interpreted in more detail. In a case where the present embodiment is applied to the interpretation of an event that has occurred in a game in which no ball is used, it is possible to implement detection of a target by determining the size of the target and the long and narrow shape of the target by the ball detection unit 305.

Further, the determination is not limited to the determination of whether a limit time is exceeded. For example, in a case where it is possible to determine that a violation of hands or the like has occurred in which a soccer ball contacts with hands, it may also be possible to present this to a referee by displaying information indicating that the ball has contacted with hands on the display device 170 and the like. Furthermore, it may also be possible to generate a virtual viewpoint image by the control device 150 based on the frame corresponding thereto and present the generated virtual viewpoint image to a referee by displaying it on the display device 170 and the like. Due to this, it is possible to assist the referee in performing determination. Furthermore, in a case of assisting the referee in performing determination, it is also possible to make the determination-target place easier-to-see for the referee by setting the target spatial portion at which it is deemed that the contact has occurred at the center in the image.

Further, it is also possible to apply the present embodiment to the output of information relating to the speed at the time of dribble of a player in a game, such as soccer, basketball, and handball. It is also possible to output information indicating the speed at the time of dribble of a player in a case where the ball is detected in the position relationship with the same player by the ball detection unit 305 during a predetermined period of time from the time timed by the timer device 180. That is, during a certain period, it is also possible to output the speed at the time of dribble of a player, which is derived by using information generated based on two frames immediately after the ball and the player have contacted with each other and the frame interval between which is a predetermined value or more.

Further, in the above, although the contact between a person (player) and an item (ball and the like) is explained mainly, the contact is not limited to this. For example, it may also be possible to specify a contact between persons (foul and the like).

Other Embodiments

It is also possible to implement the present disclosure by processing to supply a program that implements one or more functions of the above-described embodiments to a system or an apparatus via a network or a storage medium and to cause one or more processors in a computer of the system or the apparatus to read and execute the program. Further, it is also possible to implement the present disclosure by a circuit (for example, ASIC) that implements one or more functions.

Figure 13:
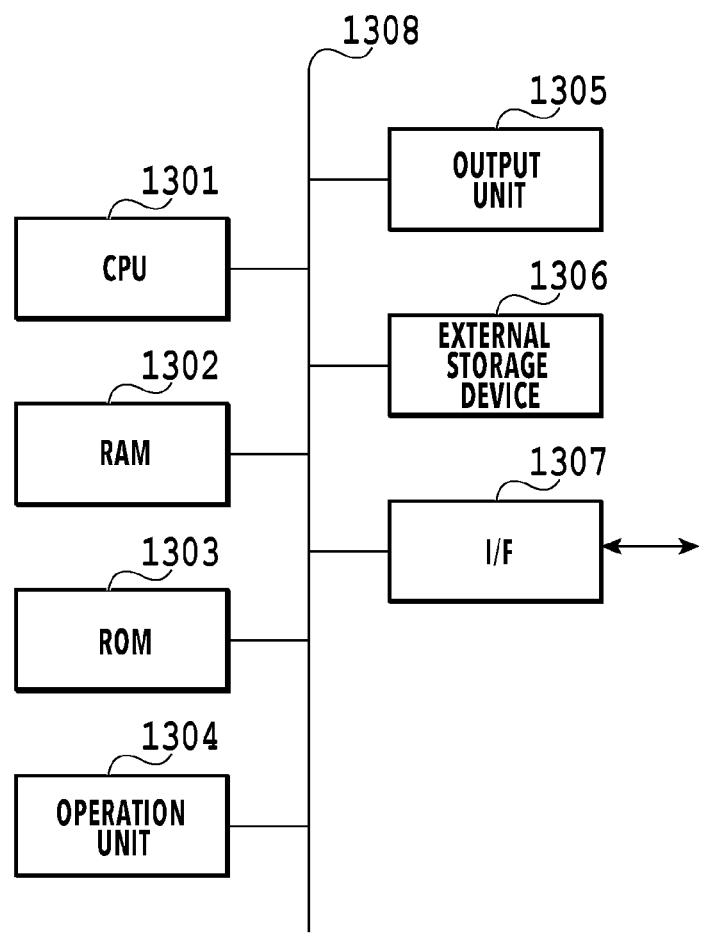
FIG. 13 is a diagram showing a hardware configuration example of a server.

As above, although the embodiments of the present disclosure are described in detail, the present disclosure is not limited to the above-described embodiments and it is possible to make various variations and alterations within the scope of the gist of the present disclosure described in the claims. FIG. 13 is a block diagram showing a configuration example of hardware of a computer that can be applied to an apparatus, such as the server 130 of the system of the above-described embodiments.

A CPU 1301 performs each piece of processing described above on the assumption that an apparatus, such as the server 130 of the system of the above-described embodiments performs, as well as performing control of the entire computer using computer programs and data stored in a RAM 1302 and a ROM 1302. That is, the CPU 1301 functions as each processing unit shown in FIG. 3.

The RAM 1302 has an area for temporarily storing computer programs and data, which are loaded from an external storage device 1306, data obtained from the outside via an I/F (interface) 1307, and the like. Further, the RAM 1302 has a work area used by the CPU 1301 at the time of performing various kinds of processing. That is, for example, it is possible to allocate the RAM 1302 as a frame memory and appropriately provide other various areas.

In the ROM 1303, setting data of the present computer, boot programs and the like are stored. An operation unit 1304 has a keyboard, a mouse and the like and it is possible for a user of the present computer to input various instructions to the CPU 1301 by operating the operation unit 1304. An output unit 1305 has, for example, a liquid crystal display and displays the results of processing by the CPU 1301. The operation unit 1304 and the output unit 1305 are not necessarily required and it may also be possible to input and output data to and from a connected external device via the/F 1307.

The external storage device 1306 is a large-capacity information storage device, such as a hard disk drive device. In the external storage device 1306, an OS (Operating System) and computer programs for causing the CPU 1301 to implement the function of each processing unit shown in FIG. 3 are stored. Further, it may also be possible to store each piece of image data as the processing target in the external storage device 1306.

The computer programs and data stored in the external storage device 1306 are loaded onto the RAM 1302 appropriately in accordance with the control by the CPU 1301 and taken as the processing target by the CPU 1301. It is possible to connect a network, such as a LAN and the internet, and another device, such as a projection device and a display device, to the I/F 1307 and it is possible for the present computer to obtain and send various kinds of information via this I/F 1307. A bus 1308 connects each portion of a device, such as the server 130, and transmits information.

With the configuration described above, the operations described in the above embodiments are controlled mainly by the CPU 1301.

It is also possible to achieve the object of the present disclosure by supplying a storage medium storing codes of computer programs implementing the functions described previously to the system and by the system reading and executing the codes of the computer programs. In this case, the codes of the computer programs themselves read from the storage medium implement the functions of the embodiments described previously and the storage medium storing the codes of the computer programs constitutes the present disclosure. Further, the present disclosure also includes a case where the operating system (OS) or the like running on the computer performs part or all of the actual processing based on instructions of the codes of the computer programs and by the processing, the functions described previously are implemented.

Further, it may also be possible to implement the present disclosure by the following aspect. That is, the present disclosure also includes a case where computer program codes read from a storage medium are written to a memory comprised by a function extension card inserted into a computer or a function extension unit connected to the computer and then based on instructions of the computer program codes, a CPU or the like comprised by the function extension card or the function extension unit performs part or all of the actual processing and thereby the functions described previously are implemented.

In a case where the present disclosure is applied to the above-described storage medium, in the storage medium, codes of computer programs corresponding to the processing explained previously are stored.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present embodiment, it is possible to obtain information capable of appropriately assisting a referee in performing determination.

This application claims the benefit of Japanese Patent Application No. 2021-064865, filed Apr. 6, 2021, which is hereby incorporated by reference wherein in its entirety.

What is claimed is:

1. An information processing apparatus comprising:
one or more memories storing instructions; and
one or more processors executing the instructions to:
generate three-dimensional shape data representing each three-dimensional shape of objects by using a plurality of images obtained by a plurality of imaging apparatuses capturing the objects, wherein the three-dimensional shape data is data represented by voxels and peripheral voxels are regarded as being part of one object;
estimate each size of the objects based on the three-dimensional shape data based on positions of the voxels;
compare each estimated size of particular objects included in the objects obtained by the estimating with a reference value based on a predetermined size of a predetermined object;
specify the three-dimensional shape of the particular object whose estimated size is smaller than the reference value as the three-dimensional shape of the predetermined object;
specify a position of the specified three-dimensional shape of the predetermined object included in particular objects among the objects that is captured by the plurality of imaging apparatuses; and
specify a contact between the particular object and the predetermined object based on the specified position of the predetermined object.

2. The information processing apparatus according to claim 1, wherein
the one or more processors execute the instructions to:
specify that the particular object and the predetermined object are in contact with each other in a case where the size of the estimated particular object is smaller than the predetermined reference value.

3. The information processing apparatus according to claim 1, wherein
the one or more processors execute the instructions to:
output information for notifying the specified contact between the particular object and the predetermined object.

4. The information processing apparatus according to claim 1, wherein
the particular object and the predetermined object are objects in a game that is captured by the plurality of imaging apparatuses.

5. The information processing apparatus according to claim 1, wherein
the one or more processors execute the instructions further to:
obtain time information relating to time; and
output predetermined information based on position information representing the position of the predetermined object and time information to be obtained.

6. The information processing apparatus according to claim 5, wherein
the position information, time represented by time information to be obtained, and time in an image capturing target captured by the imaging apparatus are associated with one another.

7. The information processing apparatus according to claim 5, wherein
the predetermined object is a basketball, and
the one or more processors execute the instructions to:
detect the basketball, and
output information relating to a game of basketball.

8. The information processing apparatus according to claim 7, wherein the one or more processors execute the instructions to:
output information indicating that a game rule of basketball is violated by further using the game rule of basketball.

9. The information processing apparatus according to claim 5, wherein
the predetermined object is a soccer ball, and
the one or more processors execute the instructions to:
detect the soccer ball, and
output information relating to a game of soccer.

10. The information processing apparatus according to claim 9, wherein the one or more processors execute the instructions to:

output information indicating that a game rule of soccer is violated by further using the game rule of soccer.

11. The information processing apparatus according to claim 5, wherein
the predetermined object is a handball, and
the one or more processors execute the instructions to:
detect the handball, and
output information relating to a game of handball.

12. The information processing apparatus according to claim 11, wherein the one or more processors execute the instructions to:
output information indicating that a game rule of handball is violated by further using the game rule of handball.

13. The information processing apparatus according to claim 6, wherein the one or more processors execute the instructions to:
output the predetermined information by using a table recording game rules.

14. The information processing apparatus according to claim 1, wherein
the one or more processors execute the instructions to:
generate three-dimensional shape data corresponding to each of a plurality of the objects in a plurality of image frames based on the plurality of image frames in a plurality of captured images,
estimate a size of each of the plurality of the objects by using the three dimensional shape data, and
specify the position of the predetermined object by comparing the size of one of the estimated objects and the predetermined reference value for each image frame.

15. The information processing apparatus according to claim 1, wherein the three-dimensional shape data is data represented by voxels and the one or more processors execute the instructions to:
estimate a size of the object based on a number of voxels on three dimensional coordinates.

16. An information processing method comprising:
generating three-dimensional shape data representing each three-dimensional shape of objects by using a plurality of images obtained by a plurality of imaging apparatuses capturing the objects, wherein the three-dimensional shape data is data represented by voxels and peripheral voxels are regarded as being part of one object;
estimating each size of the objects based on the three-dimensional shape data based on positions of the voxels;
comparing each estimated size of particular objects included in the objects obtained by the estimating with a reference value based on a predetermined size of a predetermined object;
specifying the three-dimensional shape of the particular object whose estimated size is smaller than the reference value as the three-dimensional shape of the predetermined object;
specifying a position of the specified three-dimensional shape of the predetermined object included in particular objects among the objects that is captured by the plurality of imaging apparatuses; and
specifying a contact between the particular object and the predetermined object based on the specified position of the predetermined object.

17. A non-transitory computer readable storage medium storing a program for causing a computer to perform an information processing method comprising:
generating three-dimensional shape data representing each three-dimensional shape of objects by using a plurality of images obtained by a plurality of imaging apparatuses capturing the objects, wherein the three-dimensional shape data is data represented by voxels and peripheral voxels are regarded as being part of one object;
estimating each size of the objects based on the three-dimensional shape data based on positions of the voxels;
comparing each estimated size of particular objects included in the objects obtained by the estimating with a reference value based on a predetermined size of a predetermined object;
specifying the three-dimensional shape of the particular object whose estimated size is smaller than the reference value as the three-dimensional shape of the predetermined object;
specifying a position of the specified three-dimensional shape of the predetermined object included in particular objects among the objects that is captured by the plurality of imaging apparatuses; and
specifying a contact between the particular object and the predetermined object based on the specified position of the predetermined object.

* * * * *